United States Patent [19]

Matsumoto

[11] Patent Number: 5,475,387
[45] Date of Patent: Dec. 12, 1995

[54] TRAVELLING COURSE SEARCHING APPARATUS FOR VEHICLE

[75] Inventor: Yoshiyuki Matsumoto, Saitama, Japan

[73] Assignee: Honda Giken Kogyo Kabushiki Kaisha, Tokyo, Japan

[21] Appl. No.: 369,876

[22] Filed: Jan. 6, 1995

Related U.S. Application Data

[63] Continuation of Ser. No. 69,047, May 28, 1993, abandoned.

[30] Foreign Application Priority Data

Jun. 23, 1992 [JP] Japan ................................ 4-205861

[51] Int. Cl.$^6$ ................................ G08G 1/123
[52] U.S. Cl. .................... 340/990; 340/995; 364/424.01; 364/438; 364/449
[58] Field of Search ................................ 340/990, 995; 364/424.01, 436, 437, 438, 449

[56] References Cited

U.S. PATENT DOCUMENTS 5,173,691  12/1992  Sumner ................................ 340/995
5,257,023  10/1993  Furuya ................................ 340/995

FOREIGN PATENT DOCUMENTS

| | | |
|---|---|---|
| 372840A | 6/1990 | European Pat. Off. ............ 340/995 |
| 0082318 | 4/1987 | Japan ................................ 340/995 |
| 0082319 | 4/1987 | Japan ................................ 340/995 |
| 133600 | 6/1987 | Japan . |
| 1138409 | 5/1989 | Japan . |
| 1173297 | 7/1989 | Japan . |

*Primary Examiner*—Brent Swarthout
*Assistant Examiner*—Nina Tong
*Attorney, Agent, or Firm*—Lyon & Lyon

[57] ABSTRACT

Disclosed is a vehicle travelling searching apparatus for finding an optimal course between two points preset on a road map by searching optimal partial course components on the basis of digitized road map data by use of a synthetically evaluating function including a plurality of travelling-cost-related variable parameters, changing over weight coefficients of the parameters or the function itself to adequate coefficients or function for each partial searching condition.

9 Claims, 5 Drawing Sheets

TRAVELLING COURSE SEARCHING APPARATUS FOR VEHICLE

This is a continuation of application Ser. No. 08/069,047, filed on May 28, 1993, and which designated the U.S. is now abandoned.

BACKGROUND OF THE INVENTION

The present invention relates to a travelling course searching apparatus for vehicle, which is capable of searching an optimal course connecting with each other two points preset on a road map by using the road map data.

The Japanese laid open patent publications No. 133600-87 and No. 173297-89 disclose such a vehicle travel guiding apparatus which is capable of setting any start and target points on a road map shown on a display screen and searching an optimal course therebetween on the basis of the digitized map data to guide the vehicle.

A basic method for searching an optimal course on the basis of the digital map data consists in that nodes of line segments connecting a start point to a target point on a road map are sequentially searched according to a known algorithm such as "Dijkstra" so as to obtain the shortest distance therebetween.

However, today's road maps contain an increased quantity of road data other than road distances, which may be applied for finding further optimal course from a start point to a target point in view of road parameters other than the shortest distance. Therefore, a prior art disclosed in the Japanese laid open patent publications No. 138409-89 is to search a vehicle's travelling course according to a function for evaluating travel costs relating to such variable parameters as a total distance from a start point to a target point and a mean travel time to be required, a road width, a number of turns of roadway and so on, and thereby to find an optimal course of the least cost. A synthetically evaluating function $C_i$ for a portion $i$ of a travel course is, by way of example, expressed as follows:

$$C_i = k_1 \cdot l_i + k_2 \cdot t_i + k_3 \cdot w_i + k_4 \cdot n_i^2 \tag{1}$$

where $l_i$—a distance cost, $t_i$—a mean travel time cost, $w_i$—a road width cost, $k_1$ to $k_4$—weight coefficients of respective costs on the condition that $k_1, k_2, k_3, k_4 \geq 0$.

Since the wider road may decrease a travelling cost, the road width cost $w_i$ at a distance $l_i$ and a mean road width $W_i$ can be expressed as $w_i = l_i / W_i$.

The equation (1) means that the travelling cost of the course portion may increase as the distance and the mean travelling time increase and may decrease as the road width increases (making easier to drive the vehicle). If the number of turns of the course portion is small, it may scarcely affect the travelling cost. But, a large number of turns causes a heavy load to the driver, thereby sharply increasing the travelling cost.

In reverse to the above-mentioned evaluating function it is also possible to induce such an evaluating function that an optimal course may be of the maximum value.

The introduction of such a synthetically evaluating function makes it possible to judge which one among different courses shall be selected in view of a number of road parameters such as distance, mean travelling time, road width, the number of turns of a traveling course and the like by comparing the values according to the function.

However, in case of searching an optimal course from a start point to a target point by comparing costs of parameters by means of the evaluating function such a problem may occur that preset constant weight coefficients of variable parameters of the function are not always adequate to local searching conditions.

As shown in FIG. 3, for example, when a driver wishes to travel from a start point S to a target point O on a road map by selecting a main road (highway) which has generally excellent travelling cost parameters as to distance and road width, travel course searching shall be done in such a way that a highway MR extending near from the start point S and near to the target point O is first selected and then a local path PR1 connecting the start point S to the highway MR and a local path PR2 connecting the highway MR to the target point O is searched.

If in this case a travelling course of least cost value is searched according to an equation (2) of the synthetically evaluating function C1 which, for example, has a weight coefficient 1.0 of distance cost l and a weight coefficient 0.1 of road width cost w, and the function C1 is applied to, for example, a course portion of distance l=100 m and road width W=5 m, the distance cost is determined as 1.0×100 m=100 and the road width cost is determined as 0.1×(100 m/5 m)=2. Application of such function regarding the distance higher than the road-width may result in selecting a narrow local road LR instead of the highway MR as shown in FIG. 4.

$$C1 = 1.0 \times l + 0.1 \times (l/W) \tag{2}$$

If a function C2 having a decreased distance cost l and an increased road-width cost W as expressed by an equation (3) is applied for searching a course portion of 100 m in distance and 5 m in road width, the distance cost is determined as 0.5×100 m=50 and road width cost is determined as 1.0× (100 m/5 m)=20. When a travelling course of the least cost is searched by use of the function C2 having the considerably weighted road-width cost, a highway MR may be selected but longer roadways PR1' and PR2' connecting the highway, respectively, to the start point S and the target point O may also be selected because of regarding the road width higher than the distance, as shown in FIG. 5.

$$C2 = 0.5 \times l + 0.1 \times (l/W) \tag{3}$$

SUMMARY OF THE INVENTION

In view of the foregoing, the present invention was made to provide a travel course searching apparatus for a vehicle, which is capable of searching an optimal course connecting with each other two points preset on a road map on the basis of the road map data by use of a synthetically evaluating function including a plurality of cost-related variable parameters such as travelling distance, road width and the like, and which is also capable of changing weight coefficients of the above-mentioned cost-related parameters for the function or the function itself to be suitable for each searching area's condition during sequential search of the course portions.

Figure 1:
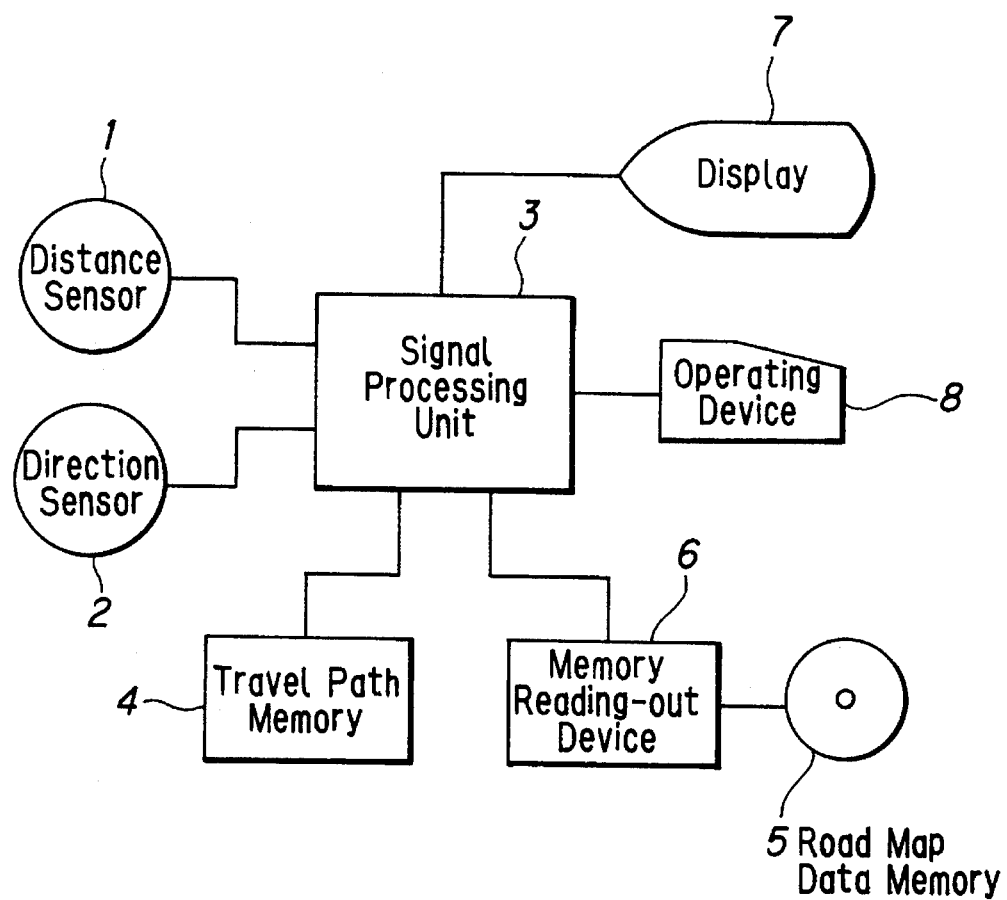
FIG. 1 is a block diagram showing an example of a vehicle travel guiding apparatus for which the present invention is applied.

In these drawings, there are shown a distance sensor 1, a direction sensor 2, signal processing unit 3, a travelled path memory 4, a read map information memory 5, a memory reading-out device 6, a display 7 and an operating device 8.

DESCRIPTION OF THE PREFERRED EMBODIMENT

Referring now to the drawings, a preferred embodiment of the present invention will be described in detail as follows:

FIG. 1 shows a vehicle travelling course searching apparatus embodying the present invention, which comprises, for example, a distance sensor 1 producing a pulse signal per unit running distance to be determined by rotations per minute of the vehicle wheel axis; a direction sensor 2 producing an output signal proportional to a change of the vehicle running direction, e.g. a change of angular velocity of yaw direction; a microcomputer-aided signal processing unit 3 which calculates a travelling distance of the vehicle by counting pulse signals from the distance sensor 1, determines current location of the vehicle by X-Y coordinates by sequential calculation and controls whole system of the travel guiding apparatus; a travel path memory 4 for sequentially storing continuously changing data on coordinates of vehicle's current location and keeping said data as information of finite sequential locations; a map information memory 5 wherein digitized road map data are preliminarily stored; a reading-out device 6 for selectively reading-out road map data for necessary area from the memory 5; a display unit 7 for indicating thereon a road map reproduced on the basis of the read-out digital road map data and also for indicating thereon renewable current location of the vehicle together with its travel path and direction as necessary; an operating device 8 which gives operational commands to the signal processing unit 3 for selecting a road map area to be indicated on the screen of the display unit 7 and setting a start and a target points on the indicated map, and also selectively gives commands necessary for indicating a travel path and a running direction, changing over the direction of the indicated map and travel path, sifting indicating positions, partially enlarging the map and travel path, selecting a scale of a picture on the display screen and changing other settings for displaying.

In thus constructed apparatus, a road map is selectively read out and indicated on the screen of the display unit 7, a current location of the vehicle in X-Y coordinate system is continuously calculated to be renewed with the vehicle travelling according to the map scale preset by the signal processing unit 3, the calculation results are subsequently sent to the travel path memory unit 4 which in turn renews its memory content, and the renewed information is read out therefrom and sent to the display unit 7.

Figure 2:
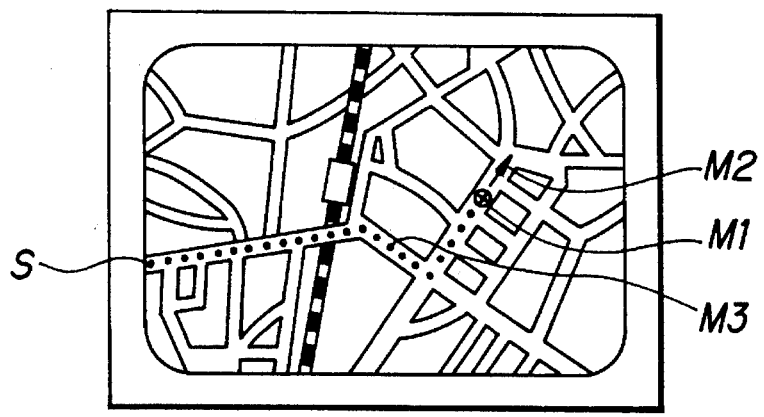
FIG. 2 shows an example of a picture shown on a display screen of the apparatus shown in FIG. 1.
Figure 3:
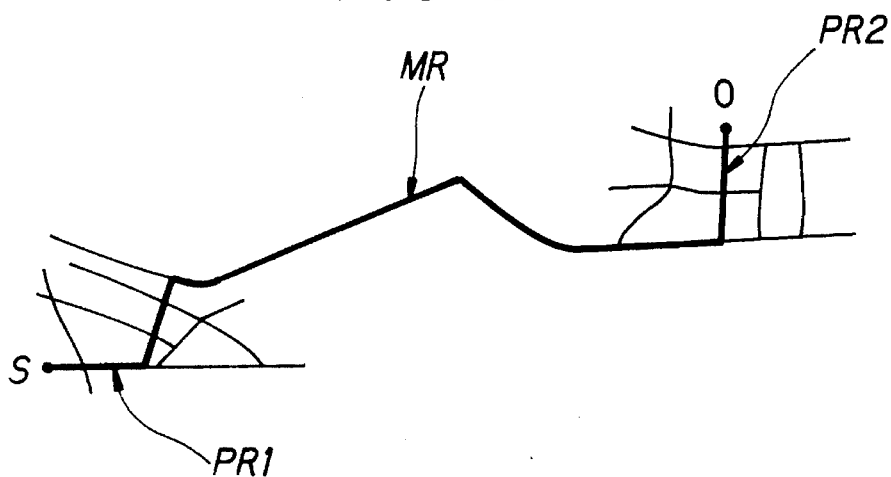
FIG. 3 shows an example of an optimal course from a start point to a target point preset on a road map.
Figure 4:
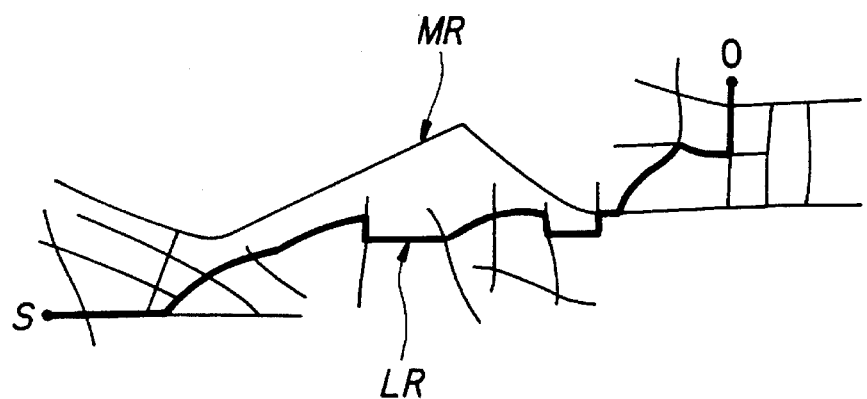
FIG. 4 shows an example of a course from a start point to a target point, which is selectable when making much account on a shorter distance.
Figure 5:
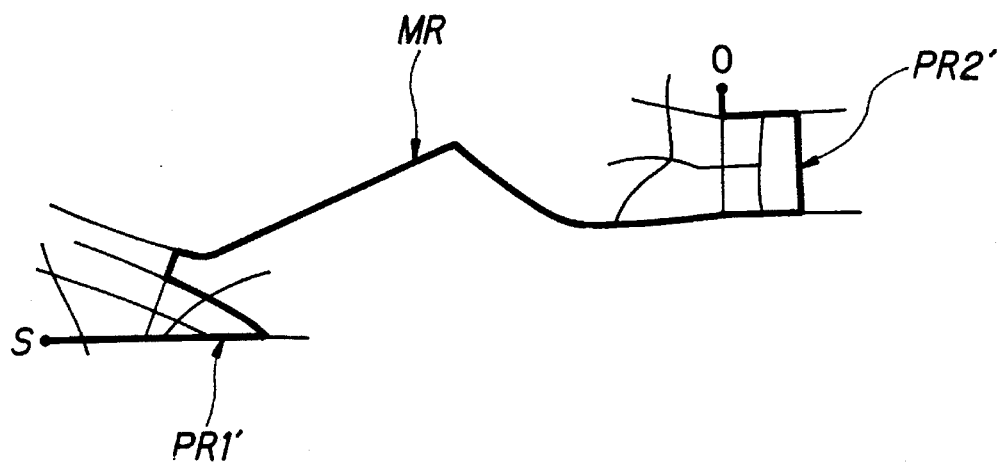
FIG. 5 shows an example of a course from a start point to a target point, which is selectable when making much account on a wider roadway.

As shown in FIG. 2, while the vehicle travels on the roadway, the display unit 7 indicates the road map on its screen, imitatively indicating thereon marks M1, M2 and M3 which denote, respectively, the vehicle's current position, its current running direction and travel path from the start point S to the current position.

The vehicle travelling course searching apparatus according to the present invention is capable of searching a least-costing travelling course between two points preset on the road map shown on the display screen according to the digital road map data read-out from the road map memory 5 by the signal processing unit 3; determining an optimal course according to a synthetically evaluating function C using a plurality of travelling cost-related parameters such as distance, mean required travelling time and road width and the number of turns of the course; and indicating said course in a special color on the road map on the display screen and renewing the current location of the vehicle in the indicated course to guide the vehicle driver.

The apparatus according to the present invention executes such a basic algorithm to generally search at first a main road (highway) MR passing near the start point S and near the target point O and then to search local roads PR1 and PR2 connecting the selected main road, respectively, with the start point S and the target point O by changing weight coefficients of the cost-related parameters of the synthetically evaluating function or the function itself to be suitable for conditions of each local area.

Such an algorithm for local course searching may be proposed that a highway MR in an area between a start point S and a target point O is first searched by using data of a coarsely illustrated road map of higher hierarchy and then local roads PR1 and PR2 connecting respectively the start point S and the target point O to the previously searched highway MR by using data of a detailed road map of lower hierarchy.

Figure 6:
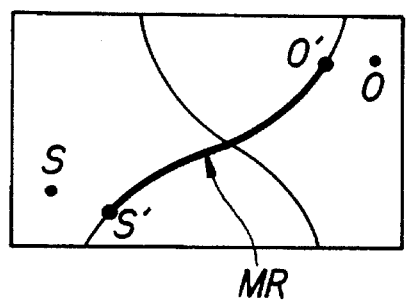
FIG. 6 shows a start point and a target point preset on a road map of the first hierarchy.

In practice, the above-mentioned hierarchical course searching is carried out, for example, in the following manner:

As shown in FIG. 6, the apparatus reads-out data of a road map of the first hierarchy containing national highways from the map information memory 5 and indicates the digital map on the display screen; finds thereon a node nearest to the start point S and a node nearest to the target point O assuming these points respectively as a temporary start point S' and a temporary target point O'; and then searches highway MR existing between the temporary start point S' and the temporary target point O' on the shown map by using the synthetically evaluating function $C2=0.5l+1.0w$ featured by a large weight of the road-width.

Figure 7:
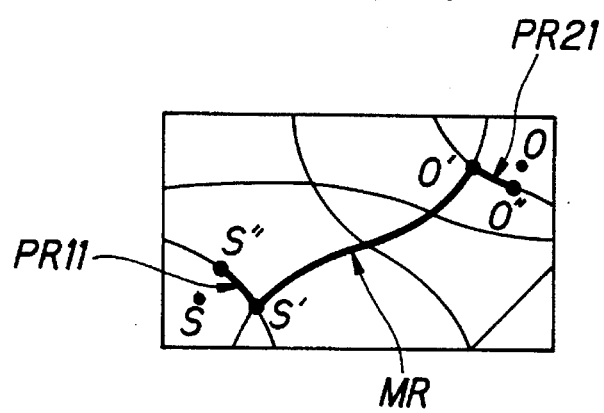
FIG. 7 shows a start point and a target point preset on a road map of the second hierarchy.

Further, as shown in FIG. 7, the apparatus reads-out data of a road map of the second hierarchy containing national and state highways from the map information memory 5 and indicates the digital map on the display screen; finds thereon a node nearest to the start point S and a node nearest to the target point O assuming these points respectively as a temporary start point S" and a temporary target point O" and also assuming the previously searched temporary start point S' as a temporary target point and the previously searched target point O' as a temporary start point; and then searches a local course PR11 existing between the temporary start point S" and the temporary target point S' and a local course PR21 existing between the temporary start point O' and the temporary target point O" on the shown map by using the synthetically evaluating function C1=1.0l+0.5w featured by a large weight of the travelling distance.

Figure 8:
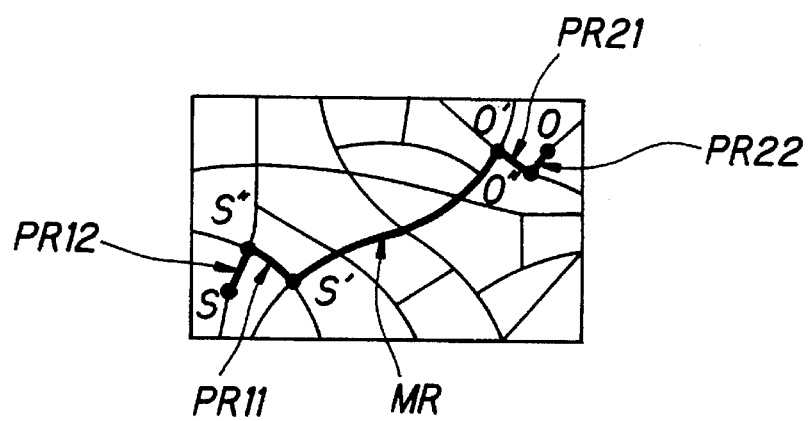
FIG. 8 shows a start point and a target point preset on a road map of the third hierarchy.

Finally, as shown in FIG. 8, the apparatus reads-out data of a road map of the third hierarchy containing city highways and upper class highways from the map information memory 5 to indicate the digital map on the display screen; and searches a local roadway PR12 connecting the start point S with the temporary start point S" and a local roadway PR22 connecting the target point O with the temporary target point O" by using a synthetically evaluating function C3=1.0 l featured by the largest weight of the travelling distance.

By forcing the apparatus to perform the above-mentioned hierarchical processing it is possible to sequentially search locally optimal courses MR, PR11, PR21, PR12 and PR22 and thereby to finally determine an optimal course from the start point S to the target point O.

Figure 9:
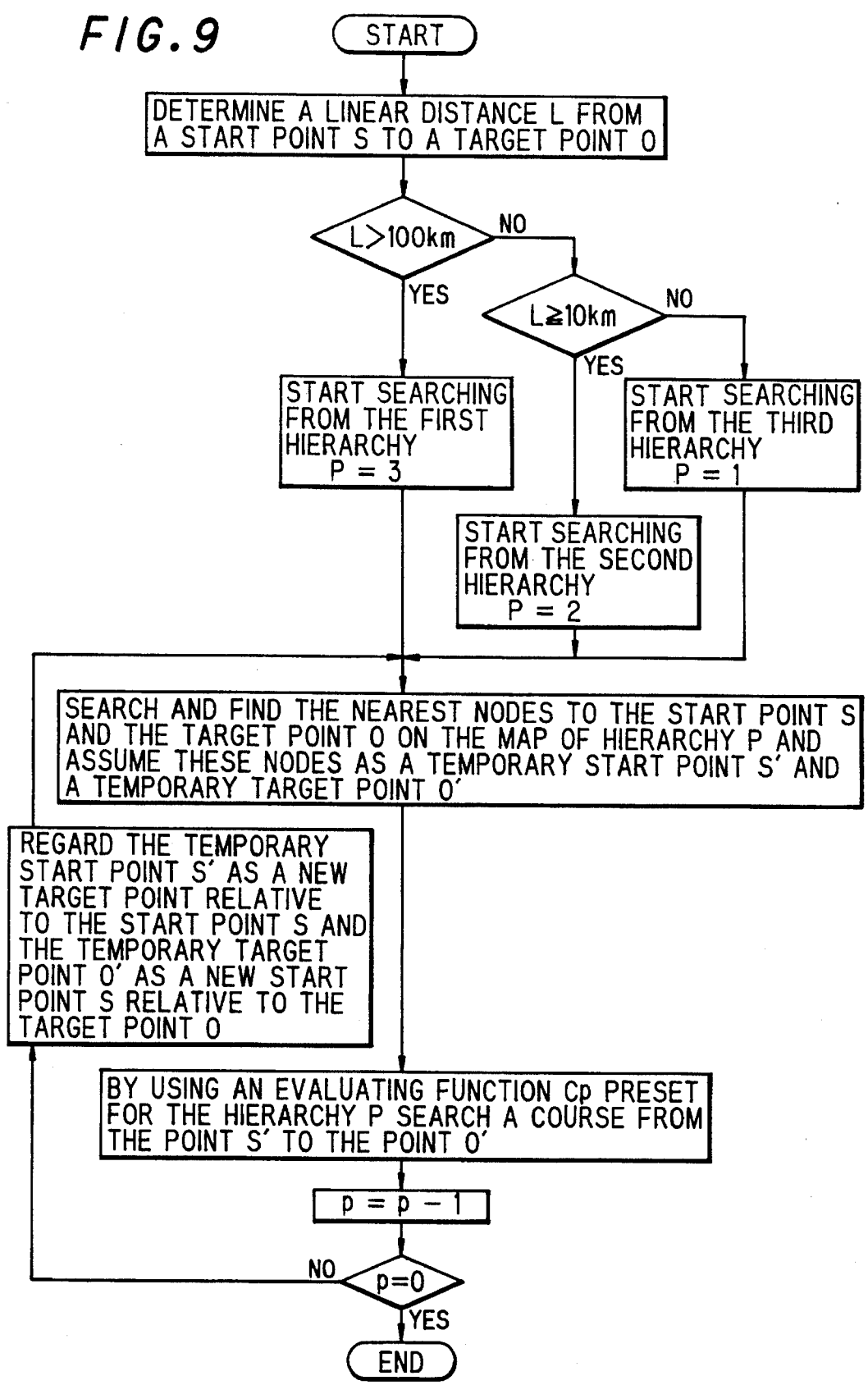
FIG. 9 is a flow chart of data processing for hierarchical searching of a travelling course.

FIG. 9 shows an example of a flow-chart of hierarchical processing for searching an optimal course by the apparatus proposed by the present invention.

In this case a linear distance L from a start point S to a target point O preset on a road map is first calculated and then searching starts from the first hierarchy if the distance L is larger than 100 Km, or from the second hierarchy if the distance is within the range of 10 to 100 km.

If there is a small distance L of less than 10 km from the start point S to the target point O, the whole optimal course therebetween will be directly searched by using data of the road map of the third hierarchy, omitting the abovementioned partial course searching operations.

Another example of a partial course searching algorithm is to divide a road map area including a start point and a target point into three or more sections to be separately searched and also to change weight coefficients of parameters for a synthetically evaluating function or the function itself in such a way that an increased weight of travelling distance may be selected when searching courses on both end sections and an increased weight of road width may be selected when searching a course (courses) in an intermediate section (sections).

Figure 10:
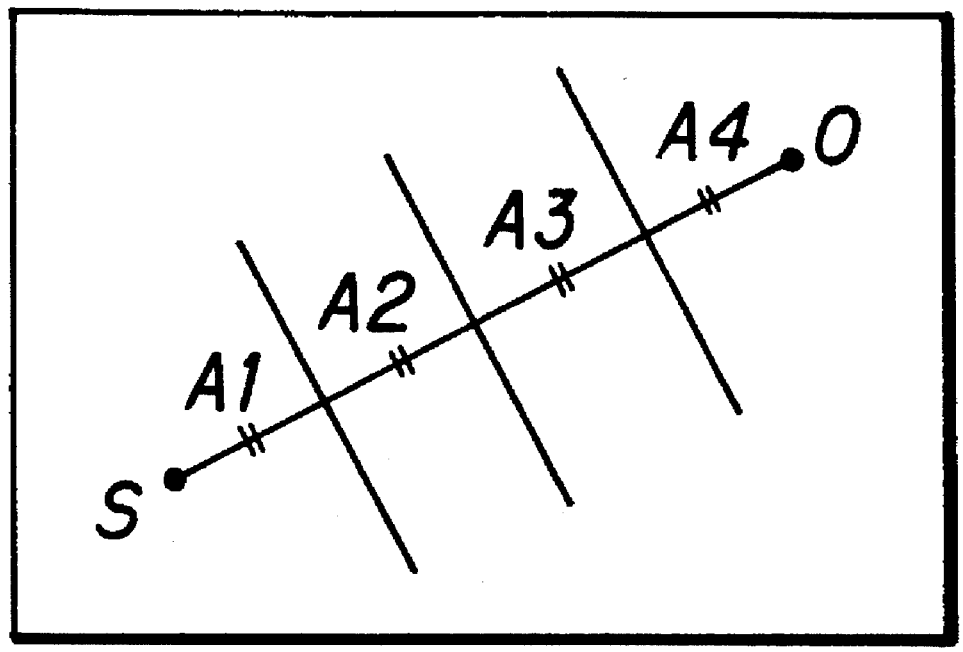
FIG. 10 shows divisions on a road map, which is obtained by dividing a linear distance between a start point and a target point preset on a road map into 4 even segments.

For instance, as shown in FIG. 10, it is possible to determine a linear distance L between a start point S and a target point O on a road map, divide the road map area into 4 sections A1, A2, A3 and A4 by quartering the distance L, search optimal partial courses in both end sections A1 and A4 by use of the synthetically evaluating function C1=1.0l +0.5 w with an increased weight of travelling distance and search optimal partial courses in intermediate sections A2 and A3 by use of the synthetically evaluating function C1=0.5l +1.0W with an increased weight of road width.

By doing so, it is possible to search a main course (highway) in intermediate sections A2 and A3 by priority of road width and to search roads connecting the main road with the start point S and the target point in both end sections by priority of travelling distance.

As is apparent from the foregoing description, the vehicle travelling course searching apparatus according to the present invention offers such an advantage that when searching least costing partial courses composing a whole course from a start point to a target point preset on a road map indicated on a display screen on the basis of digitized map data by using a synthetically evaluating function having travelling cost-related variable parameters such as travelling distance, road width and so on, it is possible to change weight coefficients of the parameters for the function or the function itself in accordance with each partial searching condition, i.e., to search an optimal partial course by priority of road width or travelling distance, thereby selecting an optimal whole course from the start point to the target point.

What is claimed is:

1. A vehicular travel course searching apparatus for identifying a course connecting two selected points on a road map depicted on a display screen by using selected functions for evaluating a course of travel, said functions including parameters representing a plurality of travelling costs including at least a travelling distance cost and a road width cost, each parameter having a variable weight coefficient, said course searching apparatus comprising:

a signal processing unit electronically coupled to a display, a data entry device, a travel path memory, and a memory read-out device, said memory read-out device being electronically coupled to a road map data memory; and said signal processing unit including first processing means for identifying a main course formed by a main road between two points adjacent to said selected points, said first processing means processing data of a main road map using a first selected function for evaluating a travelling course and being initialized such that increased weight is assigned to a road width cost parameter; and second processing means for identifying course components connecting, respectively, said selected points with said identified main course, said second processing means processing data representing a detailed local road map using a second selected function for evaluating a travelling course, and being initialized such that increased weight is assigned to a distance cost parameter.

2. A machine implemented process for identifying an optimal path of travel between two locations represented by first and second points on a road map, said process comprising the steps of:

retrieving a first digital representation of said road map from a memory, said first digital representation of said road map having a first degree of detail;

identifying a first hierarchical path between said first and second points using a first path evaluation algorithm, said first path evaluation algorithm comprising a first multiple variable travel evaluation function including a plurality of variables of a first weighting;

storing data representative of a plurality of nodes of said first hierarchical path within said memory;

retrieving a second digital representation of said road map and said data representative of said first hierarchical path from said memory, said second digital representation of said road map having a second degree of detail exceeding said first degree of detail; and identifying a second hierarchical path between said first and second points using a second path evaluation algorithm, said second hierarchical path including at least said nodes of said first hierarchical path, and said second path evaluation algorithm comprising a second multiple variable travel evaluation function including a plurality of variables of a second weighting.

3. The machine implemented process of claim 2, wherein said first and second multiple variable travel evaluation functions include the same variables, but wherein said variables of said respective functions have different weightings.

4. A machine implemented process for identifying a path of travel between two locations represented by first and second points on a road map, said process comprising the steps of:

retrieving a first representation of said road map from a memory, said first representation of said road map having a first degree of detail;

identifying a first path between said first and second points using a first path evaluation algorithm, said first path evaluation algorithm comprising a first multivariable travel evaluation function including a plurality of variables of a first weighting;

dividing said first path into a plurality of contiguous path segments;

retrieving local representations of said road map corresponding to each of said contiguous path segments from said memory; and identifying local paths based upon said contiguous path segments using one or more local path evaluation algorithms, each said local path evaluation algorithm including a plurality of variables of selected local weightings.

5. A travel path identification system comprising:

a memory means for storing data representative of a road map; and a microcomputer aided signal processing unit;

said microcomputer aided signal processing unit being programmed to retrieve from said memory means data of a first hierarchy representing a first node set comprising said road map;

to identify first and second nodes of said first node set, said first and second nodes being the nodes of said first node set nearest to a start point and a target point, respectively, of indicated travel;

to identify a first order path between said first and second nodes using a first path evaluation function;

to retrieve from said memory means data of a second hierarchy representing a second node set comprising said road map;

to identify first and second nodes of a second node set which are nearest to said start point and said target point respectively; and to identify second order paths between said first nodes of said first and second node sets and between said second nodes of said first and second node sets using a second path evaluation function having a weighting of variables different from said first path evaluation function.

6. A course searching apparatus for identifying an optimal course connecting two selected points on a road map depicted on a display screen, said course searching apparatus processing a path evaluation function which includes at least two parameters, each parameter having a variable weighting coefficient, and said apparatus comprising:

means for processing data representing said road map in a first routine, using said path evaluation function, to identify an optimal main course comprised of one or more main roads between said selected points, and for processing said data representing said road map in a second routine, using said path evaluation function, to identify an optimal local course between each of said selected points and respective end points of said main course; and means for selectively and independently adjusting said weighting coefficients of said parameters of said path evaluation function such that said weighting coefficients may differ when said optimal main course and said optimal local course are identified.

7. The course searching apparatus of claim 6 wherein said at least two parameters comprise at least a road width cost parameter and a distance cost parameter.

8. A navigational system for a vehicle comprising:

a road map data memory for storing for storing digitized road map data;

a memory read-out device electronically coupled to said road map data memory for selectively retrieving road map data corresponding to a selected area of travel from said road map data memory;

a microcomputer-aided signal processing unit electronically coupled to said memory read-out device and being programmed to retrieve from said memory read-out device a first digital representation of said selected area of travel, said first digital representation comprising a representation of said selected area of travel having a first degree of detail;

to identify a first hierarchical path between a first and second point within said selected area of travel using a first path evaluation algorithm, said first path evaluation algorithm comprising a first multiple variable travel evaluation function including a plurality of variables of a first weighting;

to store data representative of said first hierarchical path within a travel path memory;

to retrieve from said memory read-out device a second digital representation of said selected area of travel, said second digital representation comprising a representation of said selected area of travel having a second degree of detail exceeding said first degree of detail;

to identify a second hierarchical path between said first and second points using a second path evaluation algorithm, said second hierarchical path including at least the nodes of said first hierarchical path, and said second path evaluation algorithm comprising a second multiple variable travel evaluation function including a plurality of variables of a second weighting;

a display electronically coupled to said microcomputer-aided signal processing unit for displaying a graphic representation of said selected area of travel; and a data entry device electronically coupled to said microcomputer-aided signal processing unit for providing data defining said first and second points to said microcomputer-aided signal processing unit.

9. The navigational system of claim 8 wherein said first digital representation of said selected area of travel comprises a representation of highways within said selected area of travel, and wherein said second digital representation of said selected area of travel comprises a representation of local roads within said selected area of travel.

* * * * *